(12) United States Patent
Hyun et al.

(10) Patent No.: US 7,381,912 B2
(45) Date of Patent: Jun. 3, 2008

(54) SWITCH DEVICE AND STEERING SWITCH DEVICE USING THE SAME

(75) Inventors: Choi Nok Hyun, Miyagi-ken (JP); Mikio Shirakawa, Miyagi-ken (JP); Tatsuya Yokoyama, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 107 days.

(21) Appl. No.: 11/513,683

(22) Filed: Aug. 30, 2006

(65) Prior Publication Data
US 2007/0051597 A1 Mar. 8, 2007

(30) Foreign Application Priority Data
Sep. 5, 2005 (JP) ............................. 2005-256918
Sep. 5, 2005 (JP) ............................. 2005-256928

(51) Int. Cl.
*H01H 3/00* (2006.01)

(52) U.S. Cl. ............................. 200/4; 200/5 R; 200/14; 200/61.54

(58) Field of Classification Search .................... 200/4, 200/5 R, 11 R, 14, 17 R, 18, 61.54–61.57; 341/20, 35; 345/156, 157, 160, 163, 184
See application file for complete search history.

(56) References Cited

U.S. PATENT DOCUMENTS

| | | | |
|---|---|---|---|
| 4,918,264 A * | 4/1990 | Yamamoto et al. ......... 200/5 R |
| 5,335,743 A * | 8/1994 | Gillbrand et al. ........... 180/178 |
| 5,426,275 A | 6/1995 | Maeda et al. |
| 5,520,066 A * | 5/1996 | Tueri ........................ 74/484 R |
| 5,711,415 A * | 1/1998 | Fukuda et al. .............. 200/570 |
| 5,736,700 A * | 4/1998 | Takahashi et al. ....... 200/61.54 |
| 6,144,372 A * | 11/2000 | Chen .......................... 345/184 |
| 6,166,721 A * | 12/2000 | Kuroiwa et al. ............ 345/163 |
| 6,613,989 B2 * | 9/2003 | Tsuda et al. .................... 200/4 |
| 6,809,275 B1 * | 10/2004 | Cheng et al. ................. 200/14 |
| 7,283,124 B2 * | 10/2007 | Pai .............................. 345/167 |
| 7,295,185 B2 * | 11/2007 | Wang ......................... 345/164 |
| 2005/0067263 A1 | 3/2005 | Kawamura et al. |

FOREIGN PATENT DOCUMENTS

| | | |
|---|---|---|
| EP | 0 750 274 A2 | 12/1996 |
| FR | 2 852 443 | 9/2004 |
| WO | WO 2004/047134 A1 | 6/2004 |

OTHER PUBLICATIONS

Search Report for corresponding European Patent Application Serial No. 06018238.3-2423, dated Sep. 24, 2007.

* cited by examiner

*Primary Examiner*—Michael A Friedhofer
(74) *Attorney, Agent, or Firm*—Brinks Hofer Gilson & Lione (57) ABSTRACT

A switch device is provided. The switch device includes a circuit substrate having a fixed contact. A rubber sheet having dome-shaped protuberances is disposed on the circuit substrate. A holder is held moveable in the vertical direction. A rotatable knob is axially supported at the holder within a housing. An actuator is provided at the side of the rotatable knob. A drive portion is attached to the rotatable knob that extends out of the holder so as to be engaged with the actuator.

19 Claims, 7 Drawing Sheets

SWITCH DEVICE AND STEERING SWITCH DEVICE USING THE SAME

This application claims the benefit of Japanese Patent Application No. 2005-256918 filed on Sep. 5, 2005 and Japanese Patent Application No. 2005-256928 filed on Sep. 5, 2005, both of which are hereby incorporated by reference.

BACKGROUND

1. Field

The present embodiments relate to a switch device capable of selectively performing a switching operation with respect to a plurality of switch elements using the same operation member.

2. Related Art

Conventionally, a switch device has a plurality of switch elements arranged on a circuit substrate within the housing, an actuator that mounts over the plurality of switch elements, and an operation member swingable on the actuator, as disclosed in Patent Application No. H8-7701 (pp. 3-4, FIG. 1). In the conventional switch device, the operation member swingably held within the housing is partially exposed from the window portion formed in the housing so as to be operated by fingers of an operator. In response to the operation of the operation member, one end of the actuator is pushed to press the lower switch element so as to be driven. As the operation member is used to selectively push both end portions of the actuator, the switch ON signal may be selectively output from the plurality of switch elements.

The aforementioned generally employed switch device is operated by an operator for swingably turning the operation member. A multifunctinoal switch device may be formed by providing another switch element below the operation member so as to be pushed for performing various operations of the vehicle mounted devices with the same operation member in an integrated manner. However, the actuator and the switch elements activated during the swing operation are arranged below the operation member in the aforementioned switch device. When pushing the operation member, the actuator is pushed down, which is likely to cause operation error. Accordingly, it is difficult to realize the multifunctional switch device by adding the pushing operation. The structure having the actuator disposed between the operation member and the switch element similar to that of the conventional switch device may increase the height of the housing, thus causing difficulties in reducing the thickness of the entire device.

SUMMARY

A present embodiment provides a multifunctional switch device capable of performing a combined operation of turning and pushing as well as realizing a thin type device, and to provide a steering switch device using the switch device.

The switch device includes a housing having a window portion at a side of an operation surface. A circuit substrate is provided within the housing. First and second switch elements are disposed on the circuit substrate that generates an elastic repulsive force against a pushing drive force. An actuator is swingably held within the housing, having a swing end portion provided on the first switch element. A holder is moveably held in a vertical direction within the housing, having a lower end portion provided on the second switch element. An operation member is rotatably supported at the holder, having a portion exposed through the window portion so as to be turned and pushed.

The actuator is provided at a lateral side of the operation member and the holder. A drive portion set to have a predetermined turning radius and to extend outward of the holder is provided at one end of a rotary shaft of the operation member. An engaging portion that slidably engages the actuator with the drive portion, and a relief portion as a retracting path for the drive portion are provided. The drive portion urges the engaging portion during a turning operation of the operation member to swingably rotate the actuator such that the first switch element is pushed to be driven at the swing end portion. The second switch element is pushed to be driven by the holder while retracting the drive portion into the relief portion during the pushing operation of the operation member.

According to this embodiment, during the turning operation, the drive portion of the operation member swingably rotates the actuator lateral thereto such that the swing end of the actuator pushes the first switch element located below. During the pushing operation, the holder that axially supports the operation member pushes the second switch element located below. As the actuator and the first switch activated during the turning operation are provided lateral to the operation member, the switch device may be easily formed to be of a thin type while restraining the height of the housing from increasing. This also makes it possible to provide the space for accommodating the second switch element at the lower portion of the operation member. During the pushing operation, the drive portion of the operation member retracts to the relief portion of the actuator, thus avoiding an error of the actuator.

In one exemplary embodiment, a concave or a long hole notch through which the drive portion is inserted moveably in the vertical direction is formed in a center of a swing motion of the actuator so as to form the inner wall of the actuator opposite with respect to the notch as the engaging portion, and to form a lower range within the notch as the relief portion. In this embodiment, the turning motion of the drive portion during the turning operation allows the actuator to swingably turn smoothly. Meanwhile, the drive portion may be moved down to the relief portion without being interfered with the actuator during the pushing operation. This makes it possible to constantly perform the stable operation with the simple structure. In this embodiment, preferably, the drive portion has a portion inserted into the notch that extends in a direction in parallel with an axial direction of the rotary shaft.

The aforementioned structure is provided with a return spring engaged with the holder and the operation member so as to generate a return force during the turning operation. Even if a slight degree of looseness exists between the drive portion of the operation member and the actuator in the nonoperational state, the operation member itself may be kept free from the looseness by the return spring. The dimension accuracy may be set roughly to a certain degree, resulting in the reduced component cost and improved assembly.

In the aforementioned structure, preferably the operation member is provided with a regulated protrusion that extends perpendicularly downward from the rotary shaft, and a regulation wall for regulating an undesired movement of the regulated protrusion within the housing. This makes it possible to prevent the malfunction in pushing or turning of the operation member during the turning operation or the pushing operation, respectively by mistake. The regulation wall is provided with a concave groove into which the regulated protrusion is inserted upon the pushing operation, and a pair of curved surfaces extend across the upper ends of the concave groove, which are opposite to a lower end of the regulated protrusion with a gap left therebetween. The lateral movement of the regulated protrusion within the concave groove may be regulated irrespective of application of the strong turning force during the pushing operation. This may eliminate the possibility of causing the malfunction of the operation member to be turned by mistake. Even if the strong pushing force is applied during the turning operation, the downward movement of the regulated protrusion is restricted to the curved surface. This may eliminate the possibility of causing malfunction of the operation member to be pushed by mistake.

Each of the first and the second switch elements is provided with a fixed contact fixedly provided on the circuit substrate, a dome installed on the circuit substrate around the fixed contact and elastically buckling distorted, and a moveable contact provided to the inside of the dome so as to be moveable with respect to the opposing fixed contact, wherein the dome is pushed to be driven and buckling distorted such that the moveable contact abuts against the fixed contact. The water-resistance and dust resistance of the contact portion may be considerably improved, and relatively large elastic repulsive force and clear sense of click may be generated by the dome. Preferably, the reliability and the operation sense may be improved with the simple structure. A rubber sheet is provided on the circuit substrate having protuberances each corresponding to the dome protruding from a plurality of positions, and the moveable contact is provided on a ceiling plane of each of the protuberances. It is preferable as the number of components may be reduced and the assembly may be improved.

The device may be formed into a thin type while suppressing the increase in the height of the housing of the steering switch device to be installed on the steering wheel. The space for accommodating the second switch element may be readily provided below the operation member. As the drive portion of the operation member may be retracted into the relief portion of the actuator during the pushing operation of the steering switch device, the malfunction of the actuator may be avoided.

The drive portion of the operation member swingably rotates the actuator lateral thereto during the turning operation such that the first switch element is pushed to be driven. During the pushing operation, the holder that axially supports a turn knob pushes the second switch element to be driven. As the actuator and the first switch element activated during the turning operation are provided lateral to the operation member, the height of the housing may be easily restricted from increasing. The space for accommodating the second switch element may be readily provided below the operation member. As the drive portion of the operation member may be retracted into the relief portion of the actuator, the malfunction of the actuator may be avoided. The multifunctional switch device may be provided, which is capable of performing a plurality of operations including the turning operation and the pushing operation as well as making the device to a thin type.

DESCRIPTION OF THE PREFERRED EMBODIMENTS

Figure 3:
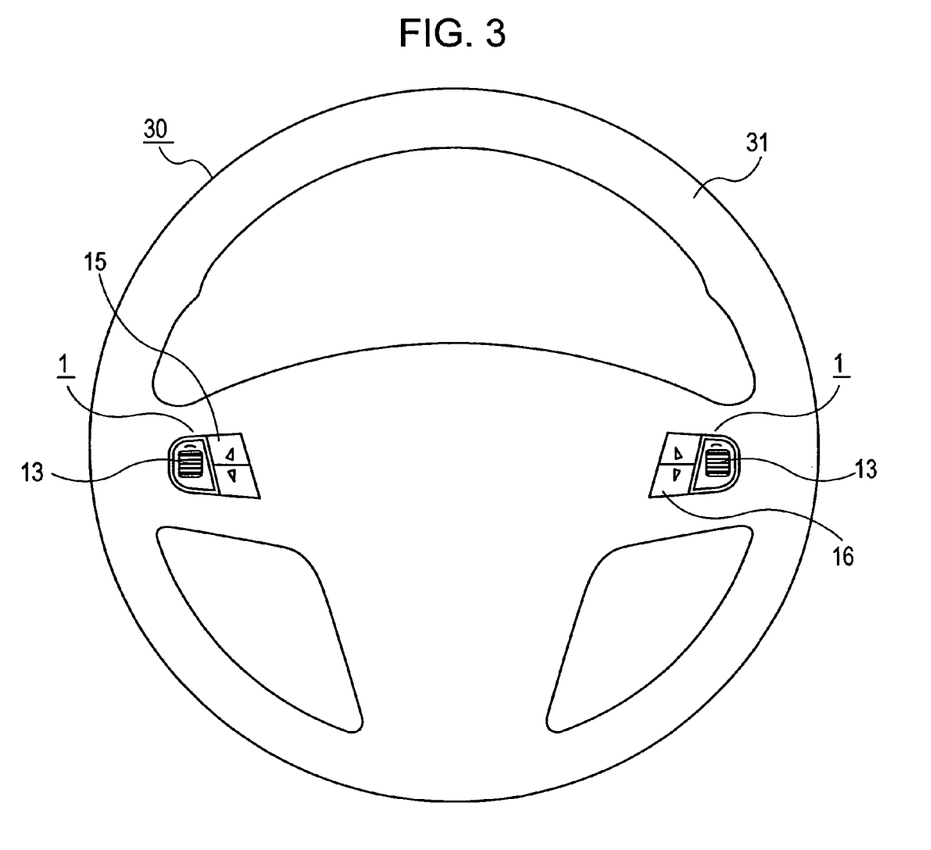
FIG. 3 is a view showing a steering wheel in which the switch device is installed.

In one exemplary embodiment, as shown in FIG. 3, a pair of steering switch devices 1 are installed inside an annular portion 31 of a steering wheel 30 of an automobile. Each of left and right steering switch devices 1 are symmetrical with each other and have essentially the same basic structure.

Figure 1:
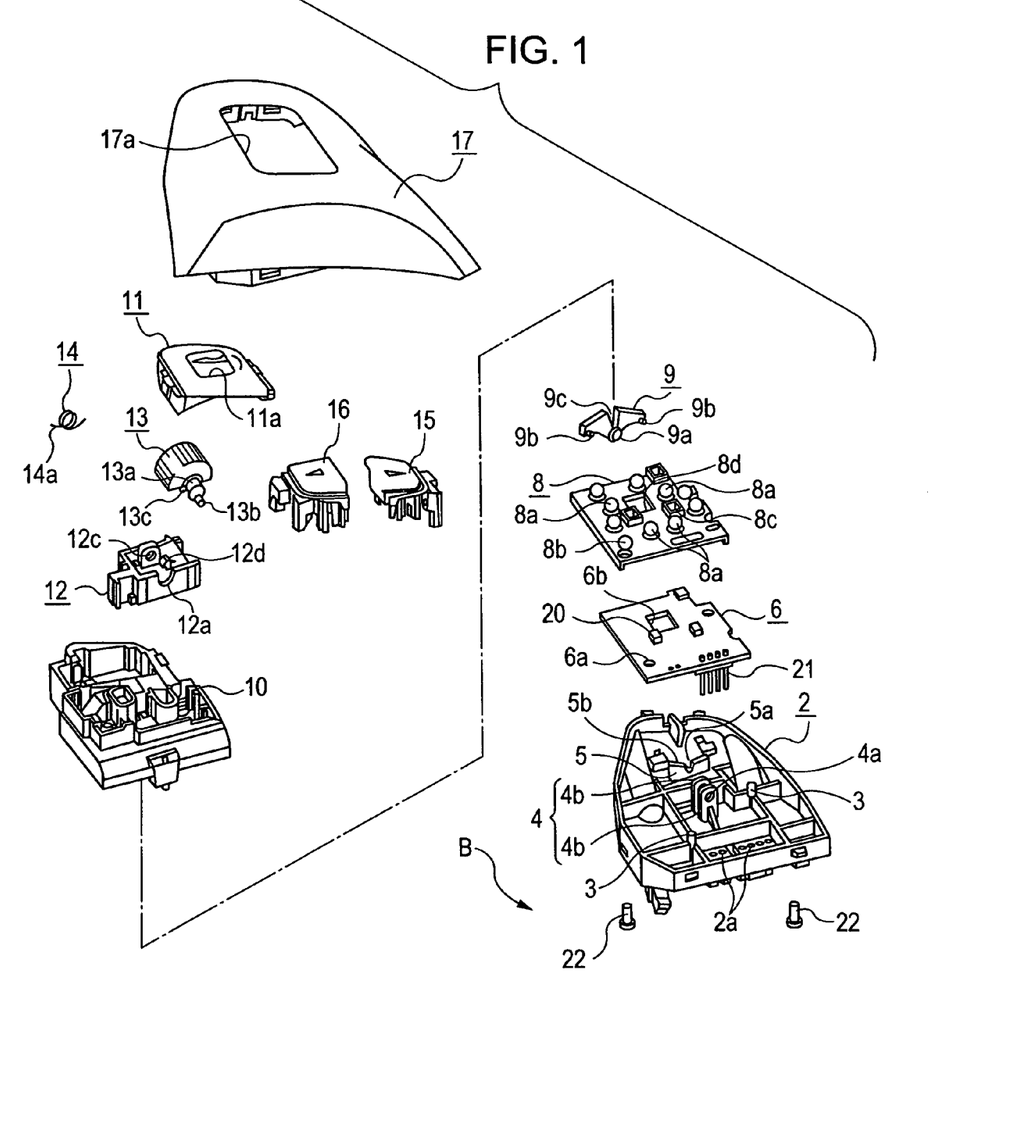
FIG. 1 is an exploded perspective view of a switch device according to one exemplary embodiment
Figure 2:
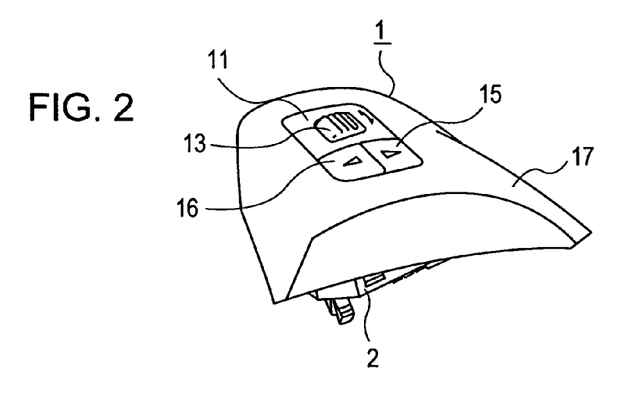
FIG. 2 is a perspective view of the switch device as a complete assembly product.

A steering switch device 1, for example, the steering switch device at the left side of FIG. 3, is provided with a lower case 2 on which a positioning pin 3, a swing support portion 4, and a regulating wall 5 are mounted. A circuit substrate 6 has a wiring pattern including a fixed contact 7 on the upper surface, and set within the lower case 2. A rubber sheet 8 is disposed on the circuit substrate 6, having a dome-shaped protuberance 8a arranged at a plurality of points thereon. An actuator 9 has a swing shaft portion 9a axially supported at a swing support portion 4, and a swing end 9b installed on the protuberance 8a. An upper case 10 is attached onto the lower case 2 to cover the circuit substrate 6 and the rubber sheet 8. A frame-like case 11 has a window portion 11a, which is combined with the upper case 10. A holder 12 is supported moveably in the vertical direction at the upper case 10 below the frame-like case 11 so as to have the lower end portion installed on the protuberance 8a.

A rotatable knob 13 is rotatably supported at the holder 12 having one end exposed through the window portion 11a. A twist coil spring 14 is wound around a rotary shaft 13a of the rotatable knob 13 and operated as a return spring during the turning operation. Two operation keys 15 and 16 are supported moveably in the vertical direction at the frame-like case 11 at two points adjacent to the upper case 10, and having the lower end installed on the protuberance 8a. A cover body 17 has an opening portion 17a for closing the lower case 2 and the upper case 10.

The above-described structure allows the turning and pushing operations with respect to the rotatable knob 13, and the pushing operation with respect to the operation keys 15 and 16 are simultaneously performed during the pushing and the depressing operation with respect to the operation keys 15 and 16. The user may be allowed to select the operation, and if one of the operations may be selected, the buckling distortion in the corresponding protuberance 8a occurs to generate the click sense. The moveable contact 18 within the protuberance 8a abuts against the fixed contact 7 on the circuit substrate 6 for turning the switch ON (see FIG. 5). The housing 19 is defined by the lower case 2, the upper case 10, and the frame-like case 11. The circuit substrate 6, the rubber sheet 8, the actuator 9, the holder 12, the twist coil rubber 14 are accommodated in the inner space of the housing 19 while exposing the rotary knob 13, the operation keys 15 and 16 stored in the inner space of the housing 19.

The rotatable knob 13 and the operation keys 15 and 16 are exposed to the upper surface of the housing 19 so as to be operated by fingers.

A positioning pin 3 for positioning the circuit substrate 6 and the rubber sheet 8, a swing support portion 4 including a pair of walls 4b each having a shaft hole 4a for the actuator 9, and a regulating wall 5 for preventing errors are mounted on the inner surface of the lower case 2. The pair of wall portions 4b are substantially parallel with each other each having the shaft hole 4a formed at opposing positions. A plurality of terminal holes 2a are formed at one side of the lower case 2. The regulating wall 5 serves to restrict the undesired movement of the regulated protrusion 13c (described later) that is attached to the rotatable knob 13 perpendicularly. The upper end surface of the regulation wall 5 forms a pair of curved surfaces 5b extending in the opposite directions with respect to the upper end of the concave groove 5a. As the regulated protrusion 13c is inserted into the concave groove 5a upon pushing of the rotatable knob 13 to be operated, the lateral movement of the regulated protrusion 13c is restricted by the inner side surface of the regulation wall 5 via the concave groove 5a. During the turning operation, the curved surface 5b is at the position opposite to the lower end of the regulated protrusion 13c with a gap therebetween. The curved surface 5b serves to restrict the downward movement of the regulated protrusion 13c.

The circuit substrate 6 is provided within the housing 19 and is substantially parallel with the window portion 11a. A wiring pattern (not shown) includes a fixed contact 7 is formed on the circuit substrate 6 as well as an LED 20 for lighting, and a terminal 21 for external connection. A plurality of through holes 6a through which the positioning pins 3 are inserted, and a cut portion 6b for accommodating the swing support portion 4 are formed on the circuit substrate 6. The circuit substrate 6 may be accurately positioned and fixed on the lower case 2 by inserting the positioning pins 3 corresponding to the respective through holes 6a, and the respective terminals 21 into the terminal holes 2a.

Figure 5:
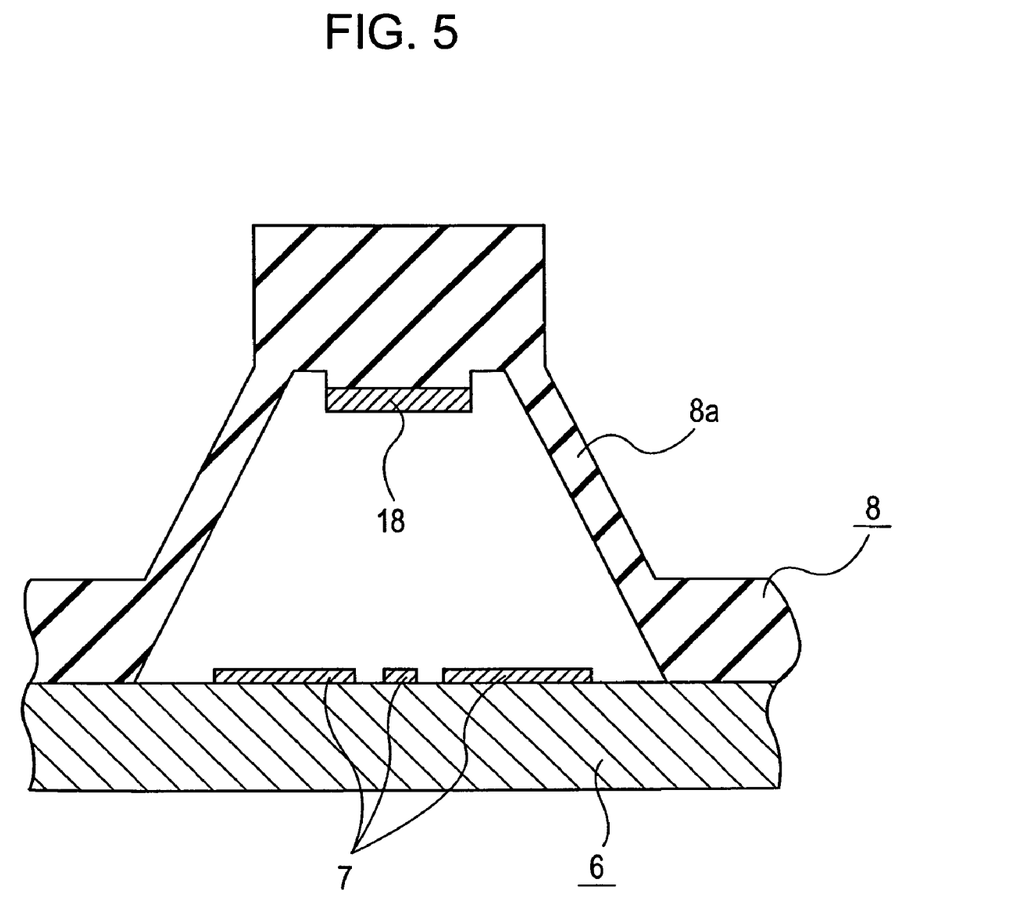
FIG. 5 is a sectional view of an essential portion of the rubber sheet installed in the switch mechanism.

In another embodiment, the rubber sheet 8 is an integral molded product formed of an elastic rubber material, on which eight protuberances 8a each allowing to have buckling distortion, two pin engagement portions 8b each engaged with the positioning pins 3, and three angular cylindrical portions 8c through which the LED 20 is inserted are formed to project from the sheet portion. A cut portion 8d that accommodates the swing support portion 4 is formed just above the cut portion 6b of the circuit substrate 6. The rubber sheet 8 is fixed on the circuit substrate 6 in the positioned state where the respective pin engagement portions 8b are fit with the positioning pins 3. Referring to FIG. 5, a moveable contact 18 formed on the ceiling plane of the respective protuberance 8a is moveably arranged at the position opposite to the corresponding fixed contact 7.

The actuator 9 includes a swing shaft 9a having the axial center coaxial with the center of the swing motion. Both ends of the swing shaft 9a are pivotally fit with shaft holes 4a of a pair of wall portions 4b such that the actuator 9 is supported swingably at the swing support portion 4. Referring to FIG. 4, the actuator 9 has a shape symmetrical to the swing shaft 9a, and has swing ends 9b at the respective ends in elastic contact with two protuberances 8a through the cut portion 8d. As the swing shaft 9a of the actuator 9 is inserted between a pair of wall portions 4b under pressure, the respective swing ends 9b are arranged on the corresponding protuberances 8a.

In one embodiment, both ends of the swing shaft 9a are further inserted into the shaft hole 4a so as to be pivotally attached. This may bring the actuator 9 into a snap connection with the swing support portion 4. The respective swing ends 9b are held at a precompressed state where the reaction force is applied from the corresponding protuberance Ba. The actuator 9 is arranged adjacent at one side of the holder 12 and the rotatable knob 13. A drive portion 13b of the rotatable knob 13 pierces through a concave groove-like notch 9c formed in the center of the actuator 9 so as to be moveable up and down. A substantially upper half of the inner wall opposite with respect to the notch 9c is formed as an engagement portion 9d with which the drive portion 13b is slidably engaged. In response to the turning of the rotatable knob 13, the drive portion 13b is also rotated together to urge one of the engagement portions 9d. The actuator 9 swingably rotates in one direction around the swing shaft 9a. The swing end 9b that has been urged moves down to push the corresponding protuberance 8a. The space below the engagement portion 9d within the notch 9c may be formed as a relief portion 9e (see FIG. 7). During the pushing operation, the relief portion 9e becomes the retracted path for the drive portion 13b.

The holder 12 formed into a substantially rectangular cylindrical shape is mounted on two protuberances 8a corresponding to pushing protrusions 12b formed at two positions on the bottom surface of the holder 12. A shaft groove 12a is formed in one of opposing wall surfaces of the holder 12, and a shaft hole 12c is formed in the other wall surface. The rotatable knob 13 is rotatably supported at the holder 12 by inserting both ends of the rotary shaft 13a of the rotatable knob 13 into the shaft groove 12a and the shaft hole 12c. Engaging stage 12d that slants to have wider upper width is provided around the shaft hole 12c of the holder 12. Both arm portions 14a of the twist coil spring 14 are elastically in contact with the engaging stage 12d. The holder 12 is supported inside the upper case 10 so as to be vertically moveable. When the rotatable knob 13 is pushed, the holder 12 moves down accompanied with the pushing such that the pushing protrusion 12b pushes the corresponding protuberance 8a.

Figure 6A:
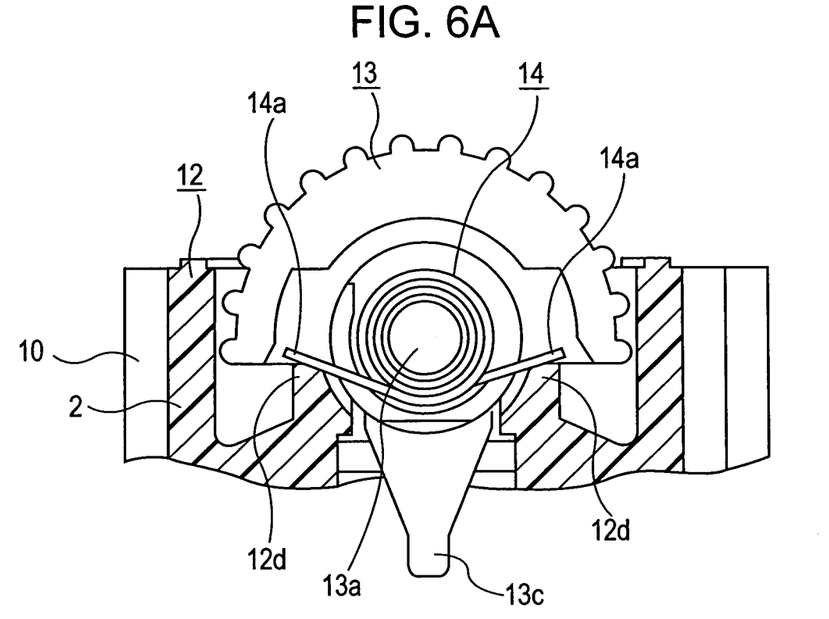
FIG. 6 is an explanatory view representing an operation of a return spring installed in the switch device.
Figure 6B:
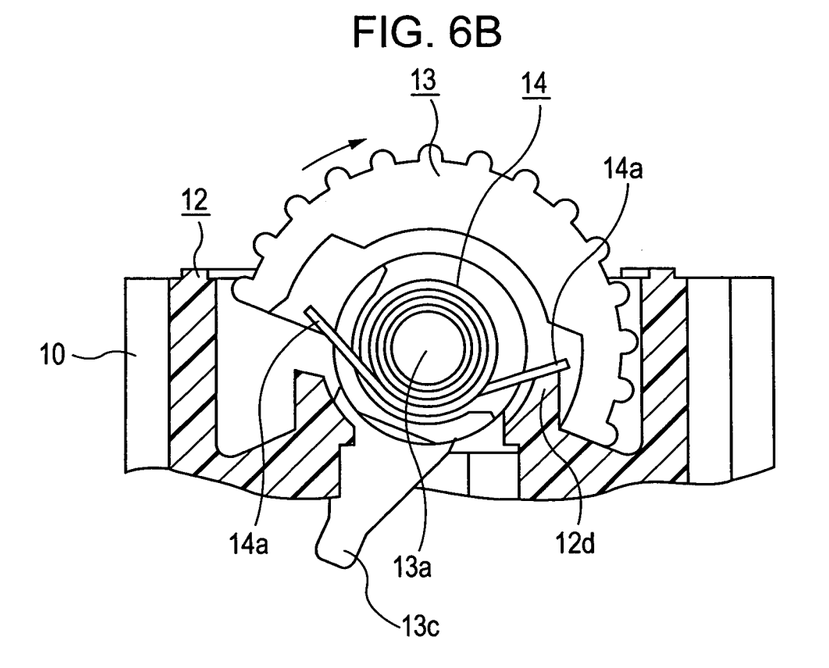

The rotatable knob 13 is formed into a substantially half column shape including a rotary shaft 13a. Both ends of the rotary shaft 13a are rotatably supported at the shaft groove 12a and the shaft hole 12c of the holder 12. The end of the rotary shaft 13a at the side of the shaft groove 12a has a drive portion 13b extending to form an L-like shape outside the holder 12. The leading end of the drive portion 13b is set to have a predetermined turning radius, and extends in parallel with the axial direction of the rotary shaft 13a so as to be inserted into the notch 9c of the actuator 9. The rotatable knob 13 is provided with a regulated protrusion 13c that perpendicularly extends downward from the rotary shaft 13a. As described above, the position of the regulated protrusion 13c that moves within the concave groove 5a of the regulation wall 5 of the lower case 2, or on the curved surface 5b is restricted. During the turning operation, the rotatable knob 13 cannot be pushed. During the pushing operation, the rotatable knob 13 cannot be turned (see FIG. 8). The twist coil spring 14 is wound in the vicinity of the end portion of the rotary shaft 13a of the rotatable knob 13 at the side of the shaft hole 12c. Referring to FIG. 6, both arm portions 14a of the twist coil spring 14 are in elastic contact with the engaging stages 12d of the holder 12, for example, respectively. When the rotatable knob 13 is turned, the arm portion 14a in the turning direction is strongly pushed by the engaging stage 12d to generate the elastic repulsive force such that the rotatable knob 13 is automatically returns after the turning operation. FIG. 6 is a sectional view in FIG. 1 seen from the arrow B, for example, in the direction from the shaft hole 12c to the shaft groove 12a of the holder 12.

A frame-like case 11 is provided at a predetermined position of the upper case 10, which is fixed to the lower case using, for example, screws 22, caulking, and the like. The upper case 10 moveably supports the holder 12 in the vertical direction in the sate where the rotatable knob 13 is exposed through the window portion 11a of the frame-like case 11, and moveably supports the operation keys 15 and 16 in the vertical direction in the state where the operation keys 15 and 16 are exposed at adjacent two positions on the frame-like case 11. In the embodiment, a separately prepared frame-like case 11 is attached to the upper case 10. However, the upper case 10 and the frame-like case 11 may be formed as an integrally molded product.

The cover 17 is fixed to the outer wall surface of the lower case 2 through snap connection and the like. The frame-like case 11 having the rotatable knob 13 exposed through the opening 17a of the cover 17, and the operation keys 15 and 16 are disposed adjacently. The operator is allowed to perform the turning operation of the rotatable knob 13 and the pushing operation of the operation keys 15 and 16 selectively by moving the fingers in the range of the opening 17a.

The operation of the structured steering switch device 1 will be described.

Figure 4A:
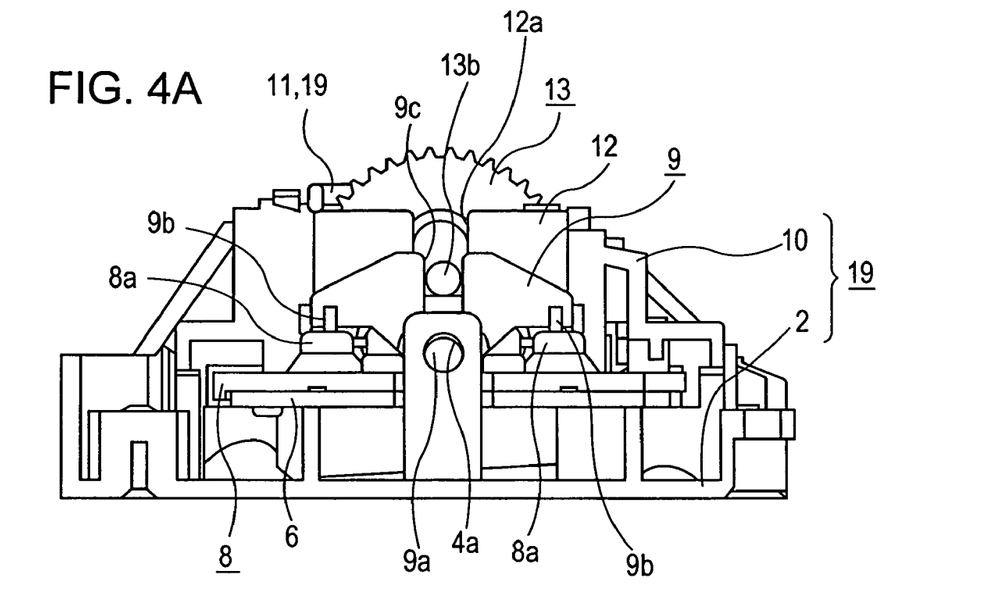
FIG. 4 is an explanatory view representing an operation of the switch device during turning operations.
Figure 4B:
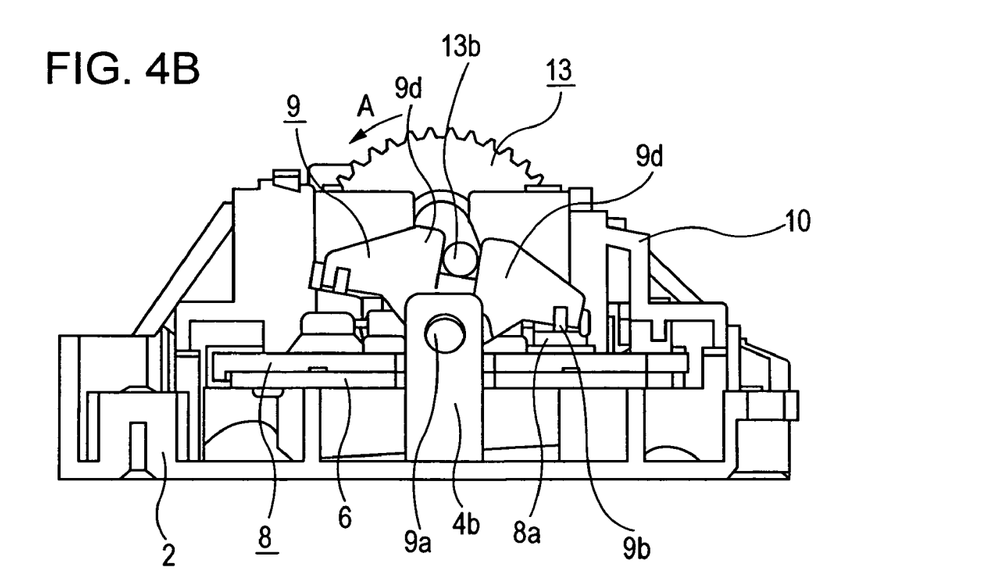

The operation resulting from the turning operation of the rotatable knob 13 will be described referring mainly to FIG. 4. In a neutral state shown in FIG. 4(a), when the operator turns the rotatable knob 13 with the fingers, the twist coil spring 14 is compressed within the holder 12, and the drive portion 13b rotates as the rotatable knob 13 turns to drive the actuator 9. Then a predetermined protuberance 8a is pushed to be driven by the actuator 9. When the rotatable knob 13 is turned in the direction of arrow A as shown in FIG. 4(b), for example, the drive portion 13b within the notch 9c of the actuator 9 rotates while pushing the engagement portion 9d at the right side in the drawing. As the actuator 9 swingably rotates clockwise around the swing shaft portion 9a, the swing end 9b at the right side of the drawing moves down while pushing the protuberance 8a below the swing end 9b. As a result, the protuberance 8a is elastically buckling distorted to generate the click sense. The moveable contact 18 within the protuberance 8a abuts against the corresponding fixed contact 7 so as to output the switch ON signal. The operation resulting from the turning operation of the rotatable knob 13 in the direction opposite to the arrow A may be the same as described above. In this case, the swing end 9b at the left side shown in FIG. 4 pushes the protuberance 8a therebelow to be buckling distorted so as to output the switch ON signal.

Figure 8A:
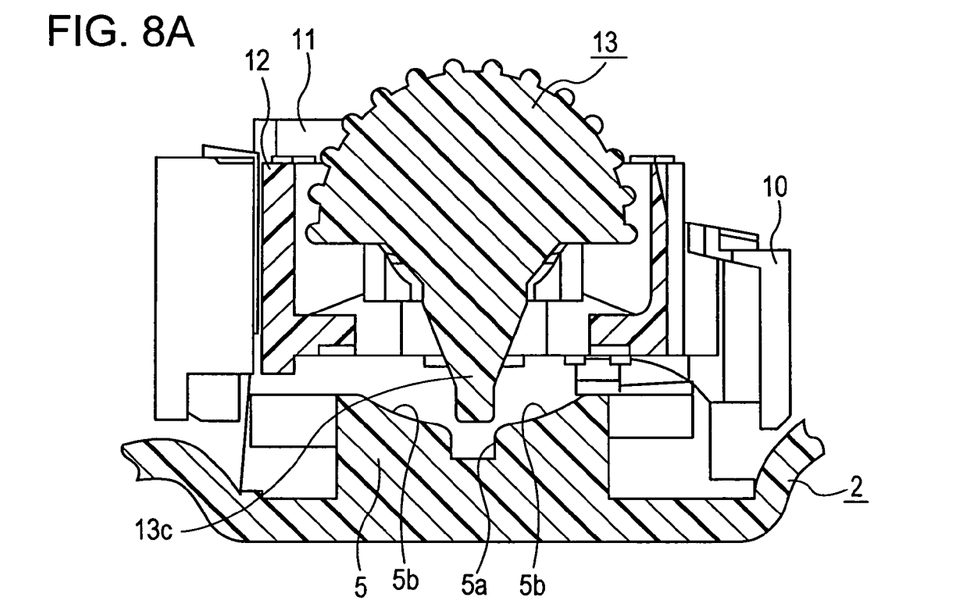
FIG. 8 is an explanatory view of an error prevention mechanism for the switch device.
Figure 8B:
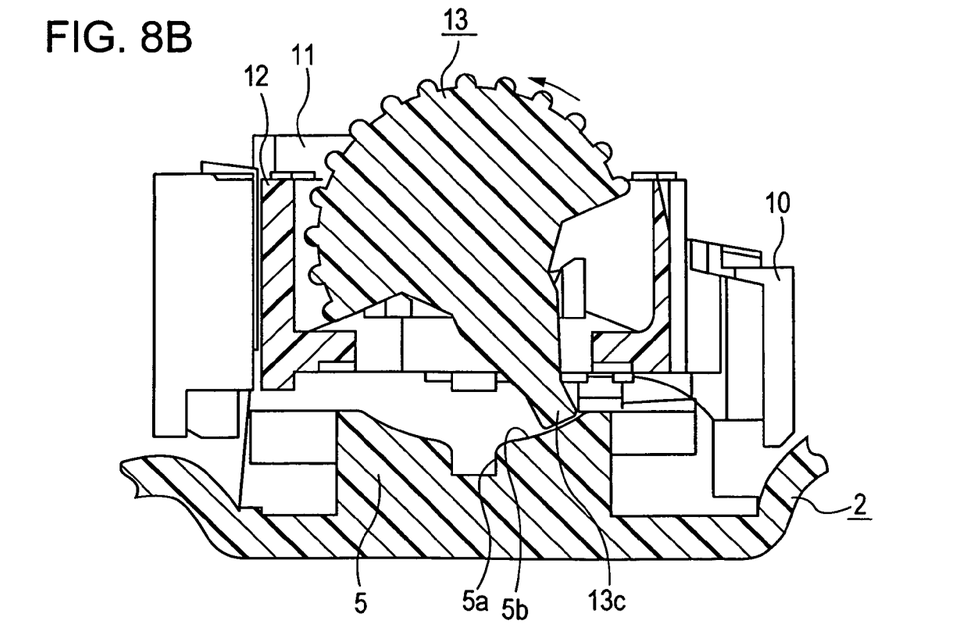

During the aforementioned turning operation, the regulated protrusion 13c rotates together with the rotatable knob 13. The regulated protrusion 13c moves above the curved surface 5b of the regulation wall 5 having a gap therebetween from the neutral state shown in FIG. 6(a) to the state shown in FIG. 8(b). If the pushing force is applied to the rotatable knob 13 during the turning operation by mistake, the movement of the regulated protrusion 13c is restricted by the curved surface 5b. Accordingly, the rotatable knob 13 cannot be pushed. It is structured to prevent the pushing operation during the turning operation.

In the state where the turning force applied to the rotatable knob 13 is removed in the state shown in FIG. 4(b), the protuberance 8a that has been buckling distorted restores the original dome shape by its own elastic force. The moveable contact 18 moves away from the fixed contact 7 so as to select the switch OFF state. The swing end portion 9b at the right side of the drawing is pushed up by the protuberance 8a such that the actuator 9 swingably rotates counterclockwise. During the turning operation, as the rotatable knob 13 urges the twist coil spring 14 in the closed state under pressure, the elastic repulsive force serves as the force for allowing the rotatable knob 13 and the actuator 9 to restore the original position. Accordingly, if the turning operation force is removed, the rotatable knob 13 and the actuator 9 are turned reversely to the respective neutral positions. This makes it possible to realize the automatic restoration to the neutral state as shown in FIG. 4(a).

When the operation force is removed after the turning operation, the elastic repulsive force of the protuberance that has been pushed by the swing end portion 9b of the actuator 9 causes the rotatable knob 13 to automatically restore to a neutral position. The structure, thus, may be made without the twist coil spring 14. If the twist coil spring 14 is assembled as the return spring as in the present embodiment, the rotatable knob 13 may be kept free from the looseness by the twist coil spring 14 irrespective of the slight looseness between the drive portion 13b of the rotatable knob 13 and the actuator 9 in the nonoperational state. The dimensional accuracy may be roughly set, thus reducing the parts cost, and improving the assembly.

Figure 7A:
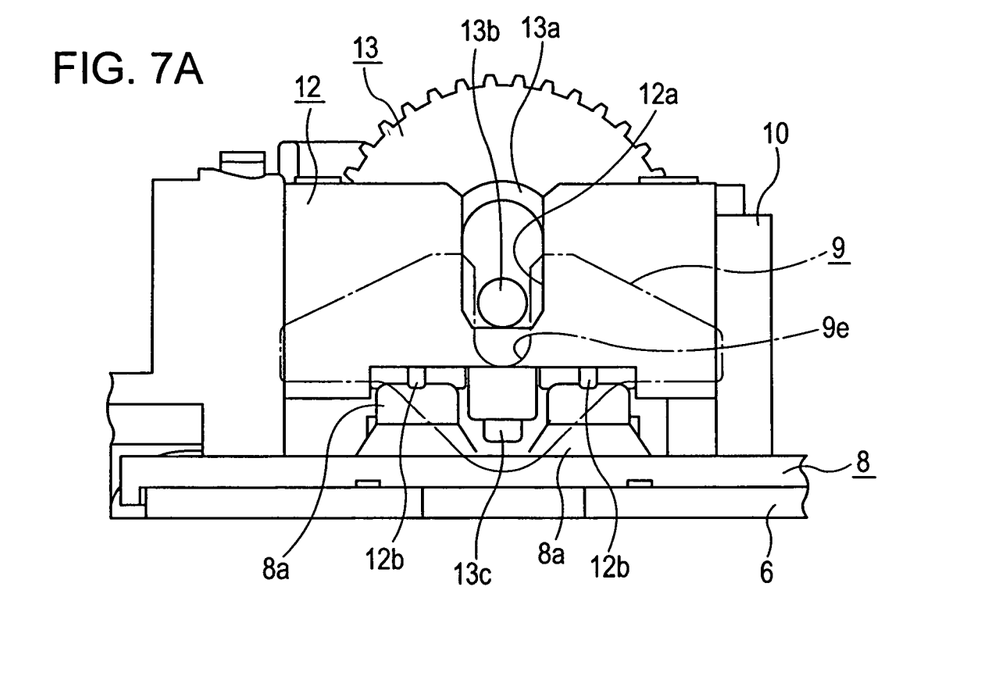
FIG. 7 is an explanatory view of the switch device during pushing operations.
Figure 7B:
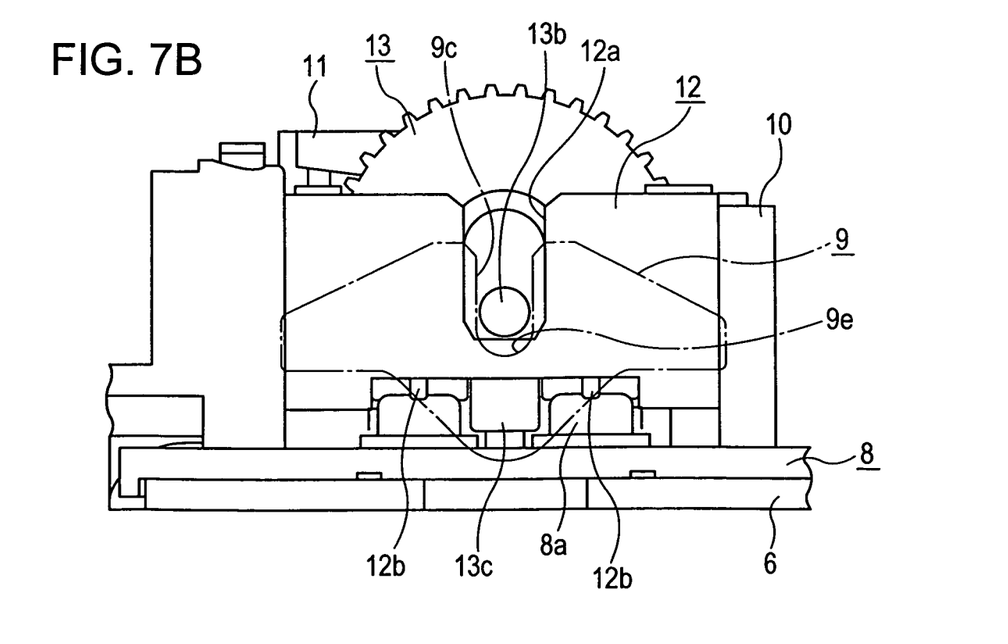

The operation resulting from the pushing operation of the rotatable knob 13 will be described referring to FIG. 7. In a neutral state as shown in FIG. 7(a), when the operator pushes the rotatable knob 13 with the fingers, the holder 12 is pushed together with the rotatable knob 13. Accordingly, a predetermined protuberance 8a is pushed to be driven by the push protrusion 12b as shown in FIG. 7(b). The protuberance 8a is elastically buckling distorted to generate the click sense. The moveable contact 18 within the protuberance 8a abuts against the corresponding fixed contact 7 such that the switch ON signal is output. At this time, the drive portion 13b of the rotatable knob 13 moves down through the notch 9c of the actuator 9 into the relief portion 9e as shown in FIG. 7(b).

The downward movement of the rotatable knob 13 or the holder 12 is not interrupted by the actuator 9. When the pushing force is removed, the protuberance 8a that has been buckling distorted restores to have the original dome shape by its own elastic force. The moveable contact 18 then moves away from the fixed contact 7 such that the switch OFF signal is output. The rotatable knob 13 and the holder 12 that have been pushed are lifted up by the protuberance 8a to automatically return to the original positions.

During the pushing operation, the regulated protrusion 13c moves down together with the rotatable knob 13. Then the regulated protrusion 13c is inserted into the concave groove 5a of the regulating wall 5 from the neutral state shown in FIG. 8(a). Even if the turning operation force is applied to the rotatable knob 13 by mistake during the pushing operation, the lateral movement of the regulated protrusion 13c is restricted by the inner side surface of the opposite regulating wall 5 via the concave groove 5a. Accordingly, the rotatable knob 13 is not turned, thus preventing the turning operation during the pushing operation.

The operation resulting from the pushing operation with respect to the operation key 15 will be described. The operation key 15 is disposed on the corresponding protuberance 8a. During the pushing operation, the protuberance

8a is elastically buckling distorted to generate the click sense, and the moveable contact 18 within the protuberance 8a abuts against the corresponding fixed contact 7 so as to output the switch ON signal. When the pushing force is removed, the protuberance 8a that has been buckling distorted restores the original dome shape by its own elastic force. The moveable contact 18 then moves away from the fixed contact 7 to output the switch OFF signal. The operation key 15 that has been pushed is lifted up by the protuberance 8a to automatically return to the original position. The operation resulting from the pushing operation with respect to the operation key 16 is the same as described above.

The switch device 1 according to one exemplary embodiment causes the drive portion 13b as the extending portion of the rotatable knob 13 to be engaged with the actuator 9 outside the holder 12. During the turning operation with respect to the rotatable knob 13, the drive portion 13b serves to swingably rotate the actuator 9. The swing end portion 9b pushes the lower protuberance 8a to be driven. During the pushing portion with respect to the rotatable knob 13, the drive portion 13b is retracted to the relief portion 9e so as to prevent error in the actuator 9 by retracting the drive portion 13b such that the holder 12 pushed together with the rotatable knob 13 serves to push the lower protuberance 8a while preventing the error of the actuator 9. For example, as the actuator 9 and the protuberance 8a operated during the turning operation are arranged lateral to the rotatable knob 13 in the switch device 1, the device can be formed to a thinner type while preventing the height of the housing 19 from being increased. This makes it possible to easily provide the protuberance 8a operated during the pushing operation below the rotatable knob 13, and holder 12.

In the switch device 1 according to one exemplary embodiment, the leading end of the drive portion 13b that extends in parallel along the axial direction of the rotatable knob 13 is inserted into the notch 9c formed in the swing center of the actuator 9. During the turning operation state, the drive portion 13b slidably moves along the engagement portion 9d of the actuator 9. During the pushing operation with respect to the rotatable knob 13, the drive portion 13b is retracted to the relief portion 9e of the actuator 9. During the turning operation, the turning operation of the drive portion 13b subjects the actuator 9 to have the swing operation smoothly. During the pushing operation, the drive portion 13b may be caused to move down to the relief portion 9e without being interfered by the actuator 9 during the pushing operation. For example, as the transmission mechanism for the operation function to transfer the operation force applied to the rotatable knob 13 is relatively simple, the stabilized operation may be always performed, thus avoiding the error in the actuator 9. The notch 9c of the actuator 9 may be formed into a long hole rather than the concave groove.

In the switch device 1 according to this embodiment, the rotatable knob 13 is provided with the regulated protrusion 13c that extends downward perpendicularly from the rotary shaft 13a. The regulated protrusion 13c has its position restricted by moving within the concave groove 5a of the regulating wall 5 and on the curved surface 5b of the lower case 2 for restricting the position. This makes it possible to prevent errors of pushing the rotatable knob 13 during the turn operation by mistake or turning the rotatable knob 13 by mistake during the pushing operation.

In the switch device 1 according to the present embodiment, the rubber sheet 8 including the protuberances 8a at a plurality of positions is provided on the circuit substrate 6 to form the switch element group selectively pushed to be driven by various operations. The risk of causing the connection error and short-circuit owing to the foreign matter such as dust or water adhered to the contact and intruding from the outside to the housing 19 becomes substantially low. The reliability of the switch elements is improved, and the number of parts may be reduced to improve the assembly. The protuberances 8a allows the relatively large elastic repulsive force to generate the click feel, thus improving the operation feel.

The present embodiment shows the switch device 1 of a composite operation type where the rotatable knob 13 and other keys (operation keys 15 and 16) are arranged. However, the operation member may be formed to have the rotatable knob 13 as the turning operation only. The present embodiment is applicable so long as the switch device provided with the operation member that allows the turning operation and the pushing operation likewise the rotatable knob 13.

The steering switch device 1 according to this embodiment causes the drive portion 13b as the extending portion of the rotatable knob 13 to be engaged with the actuator 9 outside the holder 12. During the turning operation with respect to the rotatable knob 13, the drive portion 13b serves to swingably rotate the actuator 9. The swing end portion 9b pushes the lower protuberance 8a to be driven. During the pushing portion with respect to the rotatable knob 13, the drive portion 13b is retracted to the relief portion 9e so as to prevent error in the actuator 9 by retracting the drive portion 13b such that the holder 12 pushed together with the rotatable knob 13 serves to push the lower protuberance 8a while preventing the error of the actuator 9. For example, as the actuator 9 and the protuberance 8a operated during the turning operation are arranged lateral to the rotatable knob 13 in the switch device 1, the device can be formed to a thinner type while preventing the height of the housing 19 from being increased. This makes it possible to easily provide the protuberance 8a operated during the pushing operation below the rotatable knob 13, and holder 12. Accordingly the device of seal type where the fixed contact 7 and the moveable contact 18 as the switch elements to be pushed are not exposed to the inner space of the housing 19 may be employed.

In this embodiment, the rubber sheet 8 provided with protuberances 8a at a plurality of positions is placed on the circuit substrate 6 so as to considerably improve the sealing capability of each of the switch elements. In the steering switch device 1, the risk of causing the contact error or short circuit owing to adhesion of the foreign matters such as dust and water intruding from outside into the housing 19 to the contact portion may be kept low. Each of the switching elements has the contact structure of non slidable type in which the moveable contact 18 is arranged moveably with respect to the opposing fixed contact 7. Even if the operation is repeatedly performed many times, the conduction error is unlikely to occur owing to the friction at the contact. In view of this, the reliability of the contact is improved.

If the moveable contact 18 attached within the protuberance 8a of the rubber sheet 8 is provided on the fixed contact 7 to form the switch element, the water resistance and dust resistance of the contact portion may be considerably improved. Relatively larger elastic repulsive force and clear click sense may be generated by the protuberance 8a. The reliability and the operation feel, thus, may be improved.

In the steering switch device 1 according to one exemplary embodiment, the rotatable knob 13 is provided with the regulated protrusion 13c that extends downward perpendicularly from the rotary shaft 13a. The regulated protrusion 13c has its position restricted by moving within the concave groove 5a of the regulating wall 5 and on the curved surface 5b of the lower case 2 for restricting the position. This makes it possible to prevent errors of pushing the rotatable knob 13 during the turn operation by mistake or turning the rotatable knob 13 by mistake during the pushing operation.

The present embodiment shows the steering switch device 1 of a composite operation type where the rotatable knob 13 and other keys (operation keys 15 and 16) are arranged. The operation member may be formed to have the rotatable knob 13 as the turning operation only. The present embodiment is applicable so long as the switch device provided with the operation member that allows the turning operation and the pushing operation likewise the rotatable knob 13.

What is claimed is:

1. A switch device comprising:
   a housing having an operation surface;
   a circuit substrate having first and second switch elements that generate an elastic repulsive force against a pushing drive force;
   an actuator having a swing end portion provided on the first switch element;
   a holder moveably held in a vertical direction within the housing, having a lower end portion provided on the second switch element; and
   an operation member rotatably supported at the holder, having a portion exposed through a window portion of the housing so as to be turned and pushed, wherein the actuator is provided at a lateral side of the operation member and the holder;
   a drive portion having a predetermined turning radius, which extends out of the holder is provided at one end of a rotary shaft of the operation member;
   an engaging portion that slidably engages the actuator with the drive portion, and a relief portion as a retracting path for the drive portion are provided;
   the drive portion urges the engaging portion during a turning operation of the operation member to swingably rotate the actuator such that the first switch element is pushed to be driven at the swing end portion; and
   the second switch element is pushed to be driven by the holder while retracting the drive portion into the relief portion during the pushing operation of the operation member.

2. The switch device according to claim 1, wherein a concave or a long hole notch is formed in a center of a swing motion of the actuator.

3. The switch device according to claim 2, wherein the drive portion has a portion inserted into the notch that extends in a direction in parallel with an axial direction of the rotary shaft.

4. The switch device according to claim 2, wherein the drive portion is inserted moveably in the vertical direction in the concave or long hole notch.

5. The switch device according to claim 2, wherein the concave or long hole notch forms an inner wall of the actuator, which is opposite with respect to the notch as the engaging portion, and forms a lower range within the notch as the relief portion.

6. The switch device according to claim 1, further comprising a return spring engaged with the holder and the operation member so as to generate a return force during the turning operation.

7. The switch device according to claim 1, wherein the operation member is provided with a regulated protrusion that extends perpendicularly downward from the rotary shaft, and a regulation wall for regulating an undesired movement of the regulated protrusion within the housing.

8. The switch device according to claim 7, wherein the regulation wall has a concave groove into which the regulated protrusion is inserted upon the pushing operation, and a pair of curved surfaces that extend across the upper ends of the concave groove, which are opposite to a lower end of the regulated protrusion with a gap left therebetween.

9. The switch device according to claim 1, wherein each of the first and the second switch elements comprise a fixed contact provided on the circuit substrate.

10. The switch device according to claim 9, wherein a rubber sheet is provided on the circuit substrate having protuberances each corresponding to a dome protruding from a plurality of positions, and a moveable contact is provided on a ceiling surface of each of the protuberances.

11. The switch device according to claim 9, wherein the first and the second switch elements further comprise a dome on the circuit substrate around the fixed contact and elastically buckling distorted.

12. The switch device according to claim 11, wherein the first and the second switch elements further comprise a moveable contact provided on an inside of the dome, which is moveable with respect to the opposing fixed contact.

13. The switch device according to claim 12, wherein the moveable contact abuts against the fixed contact when the dome is pushed and buckling distorted.

14. A steering wheel having a steering switch device that has the housing according to claim 1.

15. A switch device comprising:
    a housing;
    first and second switch elements;
    an actuator;
    a holder;
    an operation member, wherein the actuator is provided at a lateral side of the operation member and the holder;
    a drive portion that extends out of the holder and is provided at one end of a rotary shaft of the operation member;
    an engaging portion that couples the actuator with the drive portion, and a relief portion that is a retracting path for the drive portion and is attachable to swingably rotate the actuator such that the first switch element is driven at a swing end portion; and
    the second switch element is driven by the holder while retracting the drive portion into the relief portion during a pushing operation of the operation member.

16. The switch device according to claim 15, wherein the first and second switch elements generate an elastic repulsive force against a pushing drive force.

17. The switch device according to claim 15, wherein the operation member has a portion exposed through a window portion of the housing and is turnable and pushable.

18. The switch device according to claim 15, wherein the engaging portion slidably engages the actuator with the drive portion.

19. The switch device according to claim 15, wherein the drive portion controls the engaging portion during a turning operation of the operation member.

* * * * *